July 4, 1933.     J. SNEED     1,916,896
FLEXIBLE CONDUIT
Filed March 21, 1928
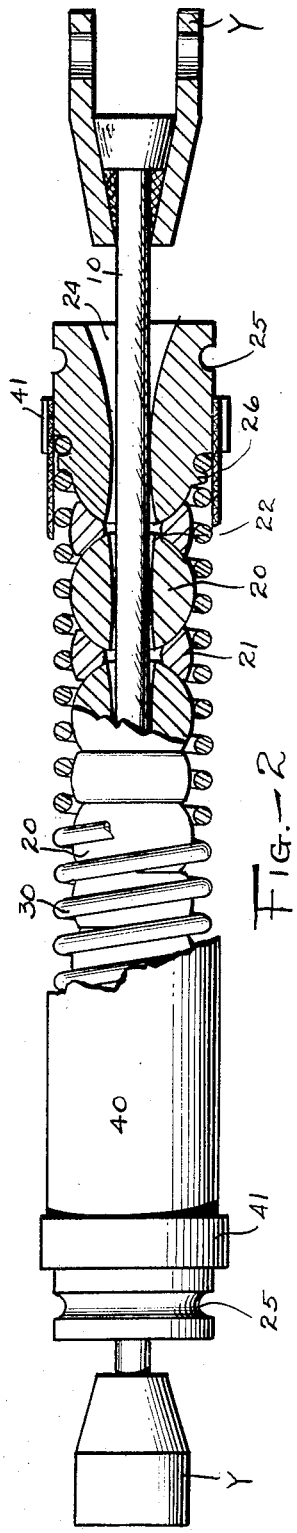
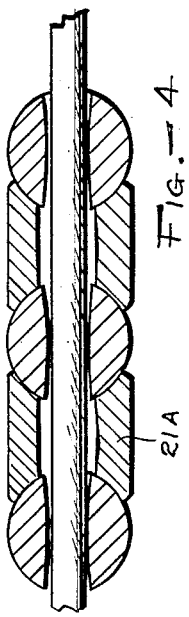
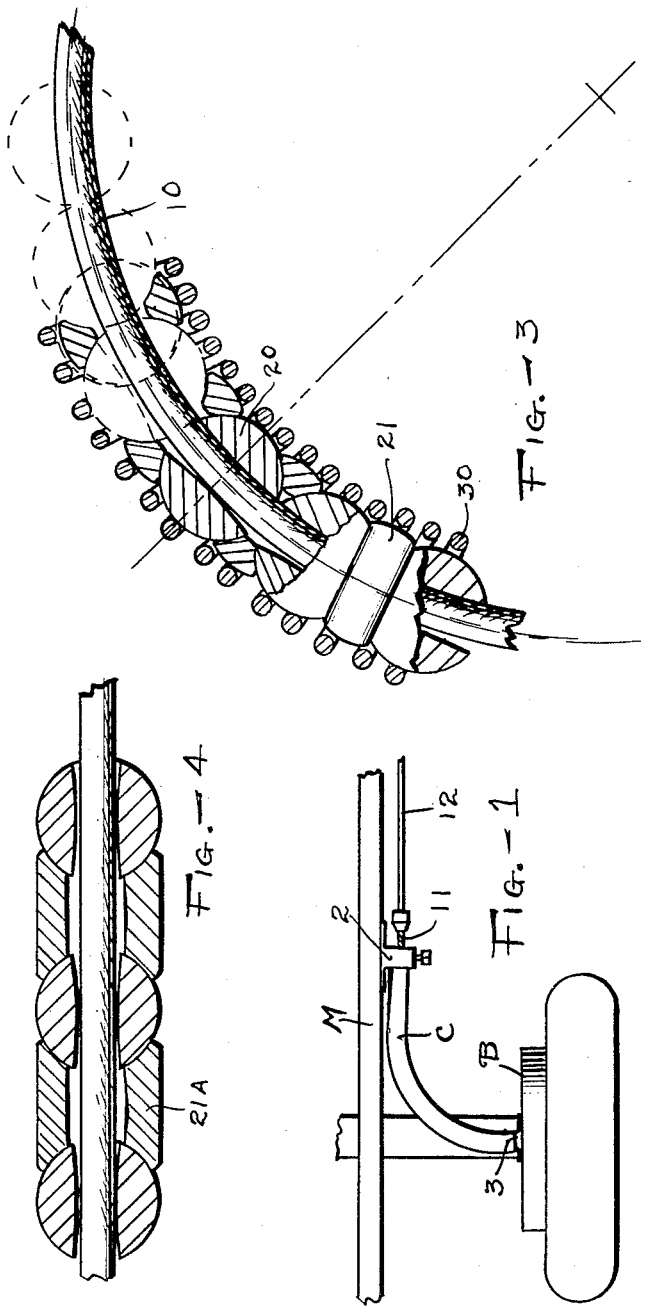
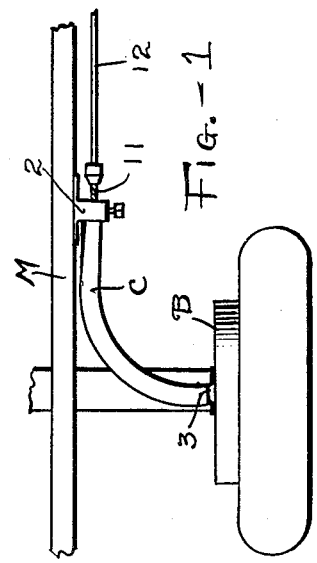

Patented July 4, 1933

1,916,896

UNITED STATES PATENT OFFICE

JOHN SNEED, OF DETROIT, MICHIGAN, ASSIGNOR TO THE MIDLAND STEEL PRODUCTS COMPANY, OF CLEVELAND, OHIO, A CORPORATION OF OHIO

FLEXIBLE CONDUIT

Application filed March 21, 1928. Serial No. 263,544.

This invention relates to vehicle brakes and more particularly to an operating connection between the linkage carried by the chains and the brakes carried by the swiveling wheels.

It is among the objects of my invention to provide a flexible force transmitting mechanism, which comprises a flexible conduit and a flexible non-extensible member carried within the conduit which may be a cable, wherein, for example, the conduit may be secured to the frame of the vehicle at one end and to the brake apron at the other end, and wherein the cable is connected to the brake linkage or pull-rod at one end and to the brake expanding mechanism at the other end, which may be for example, a toggle as shown in my copending application Serial No. 51,049 for Flexible conduits.

It is among the objects of my invention to provide a conduit which may be positioned in a horizontal plane between the chassis frame and a swiveling wheel and which will maintain a substantially constant mean effective length when the conduit is bent as the wheel swivels or rises and falls. Another object is to provide a conduit of parts which can be economically made and assembled. Another object is to provide interior surfaces in the conduit, with which the cable contacts, which will not fray or otherwise damage the cable as it is drawn along the conduit in the course of brake operation.

In the drawing, Fig. 1 is a plan showing the location of the conduit between the chassis frame and the brake; Fig. 2 is a longitudinal fragmentary section of the assembled conduit units and cable; and Fig. 3 shows the relation of the parts when the conduit is in curvature; Fig. 4 illustrates a modified form.

Referring to the drawing, in Fig. 1, I show a side member of a chassis frame M carrying a bracket 2 in which is secured one end of the conduit C. The conduit C may lie generally in a horizontal plane and extend to the brake B where it is secured in a bracket 3 carried by the back plate or apron of the brake. Within the conduit is disposed a cable 10 (see also Figs. 2 and 3) which cable extends within the brake B, and engages the shoe expanding mechanism in a manner not shown but described in my copending application mentioned above. The cable 10 is freely movable longitudinally of the conduit and has its outer end 11 extending beyond the conduit adjacent the side frame member to which is connected a brake rod 12 actuable by the operator of the vehicle through the usual linkage.

Referring particularly to Figs. 2 and 3, the conduit is shown to be built up of spherical units 20 and cylindrical units 21. The cylindrical units have concave spherical surfaces formed in each end, the surfaces being generated by a radius equal to that of the radius of the spherical units, so that when the conduit is curved, adjacent units may slide freely upon each other. The cylindrical units have an outside diameter substantially equal to the balls or spherical units and have an inside diameter appreciably greater than the diameter of the cable. I prefer that the inside diameter of the cylindrical units be so great that the cable does not touch them. The balls or spherical units have passageways 22, which have a minimum diameter in the center of the balls which is substantially equal to the diameter of the cable plus a determinable clearance to allow free longitudinal movement of the cable within the conduit. The passageways 22 in the balls are circular in a section taken normal to the longitudinal axis of the conduit and are of increasing diameter away from the middle of each ball so that outwardly flared passageways are presented by each ball to the cable. The plane of the longitudinal axis of the conduit intersects with walls of the passageways 22 as shown in Fig. 2 on curved lines which may be arcs of circles whose centers lie in a plane bisecting the balls and normal to the longitudinal axis of the conduit. The radius of these circles preferably equals the minimum radius of curvature of the conduit less the sum of the radius of the cable and the normal clearance.

Referring also to Fig. 2, end units are provided for the conduit, which preferably are generally cylindrical members engaging the cylindrical or spool members 21 and having convex spherical surfaces fitting the spool members. As shown in Fig. 2, the end members are provided with an internal passageway having a minimum cross-sectional opening slightly greater than the size of the cable. This passageway is flared outwardly toward the body of the conduit in a manner similar to the formation of the ball members. The passageway has a relatively large opening at its exposed end as at 24, which permits lateral motion of the cable relative to the exposed ends of the conduit. It will be seen that when the cable is curved, the spool adjacent the end unit may move freely with relation to that unit. The end unit is provided with an annular groove 25 by means of which it may be secured in the brackets 2 or 3 mentioned above. The end unit is also provided with external screw threads 26, the base diameter of which is substantially equal to the diameter of the balls and spools.

Referring to Figs. 2 and 3, I provide a coil spring 30 which is secured at its ends in the screw threads by the end units and overlies all of the several conduit units. In assembling the conduit, the spring 30 is extended and put in tension, thus holding all of the conduit units in close contact and preventing the coils of the spring from contacting with each other when the conduit is curved. The spring has an interior diameter substantially equal to the external diameter of the balls and spools and the spring serves the dual purpose of maintaining a pressure between units and also tending to maintain a relative lateral position of the several units with relation to each other. If desired, a cover 40 impervious to grease or other lubricant may be drawn over the outside of the spring 30, both to exclude foreign matter from the interfitting units and to retain lubricant in the unit. The cover 30 may be clasped to the end units by suitable means such as ferrules 41.

The cable which passes through the conduit has suitable yokes or fittings Y secured to its ends and for engagement with the brake rod and shoe spreading mechanism.

Referring again to Figs. 2 and 3, it will appear that in the preferred form of my invention I arrange the length of the cylindrical or spool members so that the continued spherical surfaces of the ball members contact in a point in the longitudinal axis of the conduit when the conduit is in straight line position. One skilled in the art will appreciate that the length of the spool members 21 may be varied within limits if allowance is made in the rest of the conduit construction, as pointed out herewith. Fig. 4 illustrates a modification showing the larger spool members 21A.

When the conduit is in curvature, the arcuate distances between centers of adjacent balls is necessarily greater than the straight line distances between these centers, and in this type of conduit, the spool members maintain the balls spaced from each other the same amount whether the conduit is in curvature or in straight line. The result is that the curved theoretical longitudinal axis of the conduit is greater than the straight line theoretical axis of the conduit in an amount which is a function of the length of the spool units, or stated more accurately, is a function of the distances between centers of the ball units. If no compensation were arranged in designing the conduit, the conduit would tend to creep over and include more cable in curved position than in straight line position, and this tendency would be aggravated by increasing the lengths of the spools or the distances between centers of the balls.

To compensate for the tendency of the conduit to creep over and include more cable, I arrange that the clearance between the cable and the conduit be great enough so that in curvature the axis of the cable in tension lies in a smaller arc than the axis of the conduit. The difference in length between the two arcs for a given number of degrees is preferably made equal to the difference between the mean effective lengths of the conduit in curvature and the conduit in straight line. With this compensation, the amount of cable housed within the conduit remains constant regardless of the curvature of the conduit.

While the foregoing is a description of a preferred form of my invention, changes within its scope may occur to one skilled in the art, and I do not wish to be limited other than by the claims appended hereto.

1. A flexible force transmitting device comprising a cable and a flexible conduit comprising alternate balls and spools each having central apertures generally aligned with adjacent units for the reception of the cable passing therethrough and offering substantially continuous support therefor, and normally distended resilient means secured to the ends of the conduit and compressing the several units into contact with each other and laterally engaging and supporting all of the said units.

2. The combination of a cable and a flexible conduit through which the cable is longitudinally movable comprising alternate hollow cylindrical and alternate spherical units arranged in interfitting relation, the sperical units having flared openings extending longitudinally of the conduit with a minimum diameter at the center of each unit slightly greater than the diameter of the cable housed in the conduit, the flared openings having equal maximum diameter at the ends thereof and the openings having arcuate side walls offering smooth substantially continuous support for the cable at least in curvature, and the cylindrical units having an internal diameter appreciably greater than the diameter of the said cable.

3. A conduit comprising spherical members of like diameter whose centers are spaced apart the diameter of a sphere, said spherical members having outwardly flared internal circular passageways of minimum cross-section in the center of the sphere, the walls of the passageway being curved in an arc whose radius equals the minimum radius of curvature of the conduit less half the diameter of the minimum cross section of the passageway, cylindrical members having concave end walls engaging adjacent spherical members and spaced between them, and having an exterior diameter equal substantially to the diameter of the spheres and an internal diameter at least as great as the greatest diameter of said passageways, and a coil spring of interior diameter equal substantially to the diameter of the spheres and encompassing the spherical and cylindrical members.

4. A conduit comprising spherical members of like diameter whose centers are spaced apart the diameter of a sphere, said spherical members having outwardly flared internal circular passageways of minimum cross-section in the center of the sphere, the walls of the passageway being curved in an arc whose radius equals the minimum radius of curvature of the conduit less half the diameter of the minimum cross section of the passageway, cylindrical members having concave end walls engaging adjacent spherical members and spaced between them, and a coil spring of interior diameter equal substantially to the diameter of the spheres and encompassing the spherical and cylindrical members.

5. A flexible force transmitting device comprising a longitudinal incompressible conduit and a longitudinal inextensible cable, the conduit part including a coil spring having its strands spaced apart and at least laterally engaging a portion of the conduit disposed between the spring and the cable, the last named portion of the conduit comprising alternate coacting balls and spools arranged to decrease in length in curvature on the side toward the center of curvature of the conduit and forcing the strands of said spring adjacent thereto toward the center of curvature and toward each other and permitting the cable housed in a given curved portion of conduit to equal the cable housed in a given portion of straight conduit, said balls having central apertures through which the cable passes with arcuate side walls for supporting the cable at least in curvature.

6. A flexible conduit for a cable to be housed therein and movable therethrough, comprising alternate balls and spools the balls having central apertures with smoothed curved side walls engaging the cable and offering substantially continuous support particularly in curvature, the spools having central apertures larger than the cable and being laterally shiftable with relation to the cable in curvature to permit the portions of the balls between the cable and the center of curvature to move toward each other whereby the length of cable housed within the conduit in curvature substantially equals the length of cable housed in the conduit in straight line.

7. The combination of a cable to act as an inextensible tension member, a flexible conduit therefor to act as an incompressible compression member, said conduit formed of spherical parts spaced from each other whose centers lie in the axis of the conduit whereby in curvature the longitudinal axis of the conduit tends to exceed in length the straight line axis of the conduit by an amount equal to the sum of the differences between the arcuate distance from center to center of said spheres and the cord distance from center to center of said spheres, said spherical parts having central apertures with side walls engaging the cable in the plane of curvature of the conduit in curved lines struck from the center of curvature of the conduit, said apertures having minimum diameter greater than the diameter of the cable to permit the cable to fall into a smaller arc than the curved longitudnal axis of the conduit whereby the amount of cable housed in the conduit in curvature is the same as the amount housed in the conduit in straight line regardless of the tendency of the conduit to increase in length in curvature.

8. A conduit comprising spherical members of like diameter, said spherical members having outwardly flared internal circular passage ways of minimum cross section in the center of the sphere, the walls of the passage way being curved in an arc whose radius equals the minimum radius of the curvature of the conduit less half of the diameter of the minimum cross section of the passage way, cylindrical members having concave end walls engaging spherical members and spaced between the spherical members, said spherical members being substantially equal in diameter to the length of said cylindrical members, said cylindrical members having an exterior diameter equal substantially the diameter of the spheres and an internal diameter at least as great as the greatest diameter of said passage ways.

9. A conduit comprising spherical members of like diameter, said spherical members having outwardly flared internal circular passage ways of minimum cross section in the center of the sphere, the walls of the passage way being curved in an arc whose radius equals the minimum radius of the curvature of the conduit less half of the diameter of the minimum cross section of the passage way, cylindrical members having concave end walls engaging spherical members and spaced between the spherical members, said spherical members being substantially equal in diameter to the length of said cylindrical members, the diameter of said spherical members being greater than the length of said cylindrical members.

In testimony whereof, I hereunto affix my signature.

JOHN SNEED.